United States Patent
Mora

(10) Patent No.: US 9,451,054 B2
(45) Date of Patent: Sep. 20, 2016

(54) RELIABLE TRANSPORT LAYER PROTOCOL IN LOW PERFORMANCE 8-BIT MICROCONTROLLERS

(76) Inventor: Oscar Mora, Caracas (VE)

(*) Notice: Subject to any disclaimer, the term of this patent is extended or adjusted under 35 U.S.C. 154(b) by 0 days.

(21) Appl. No.: 10/906,461

(22) Filed: Feb. 22, 2005

(65) Prior Publication Data

US 2005/0129064 A1    Jun. 16, 2005

Related U.S. Application Data

(63) Continuation of application No. 09/682,095, filed on Jul. 19, 2001, now abandoned.

(51) Int. Cl.
| | | |
|---|---|---|
| H04L 12/801 | (2013.01) | |
| H04L 29/06 | (2006.01) | |
| H04L 12/701 | (2013.01) | |
| H04L 12/18 | (2006.01) | |
| H04L 5/14 | (2006.01) | |
| H04L 29/08 | (2006.01) | |

(52) U.S. Cl.
CPC ............... *H04L 69/16* (2013.01); *H04L 29/06* (2013.01); *H04L 45/00* (2013.01); *H04L 47/10* (2013.01); *H04L 69/161* (2013.01); *H04L 69/164* (2013.01); *H04L 5/1438* (2013.01); *H04L 12/18* (2013.01); *H04L 69/326* (2013.01)

(58) Field of Classification Search
CPC ..... H04L 29/06; H04L 69/32; H04L 69/329; H04L 69/16; H04L 69/161; H04L 69/22; H04L 69/164; H04L 69/326
USPC ........ 709/230, 232, 237, 203, 231, 236, 245
See application file for complete search history.

(56) References Cited

U.S. PATENT DOCUMENTS

| | | | | |
|---|---|---|---|---|
| 6,014,705 | A * | 1/2000 | Koenck et al. | 709/230 |
| 6,076,114 | A * | 6/2000 | Wesley | 709/235 |
| 6,161,123 | A * | 12/2000 | Renouard et al. | 709/203 |
| 6,212,184 | B1 * | 4/2001 | Venkatachary | H04L 45/00 370/238 |
| 6,310,892 | B1 * | 10/2001 | Olkin | 370/473 |
| 6,351,487 | B1 * | 2/2002 | Lu | H04L 12/66 370/252 |
| 6,504,910 | B1 * | 1/2003 | Engelke et al. | 379/52 |
| 6,543,005 | B1 * | 4/2003 | Bamford | 714/18 |
| 6,567,406 | B1 * | 5/2003 | Skemer | 370/392 |
| 6,621,799 | B1 * | 9/2003 | Kemp et al. | 370/282 |
| 2002/0064137 | A1 * | 5/2002 | Garakani | H04L 5/1438 370/278 |
| 2002/0199019 | A1 * | 12/2002 | Battin | H04L 29/06 709/245 |
| 2005/0259682 | A1 * | 11/2005 | Yosef | H04L 12/18 370/468 |
| 2005/0276221 | A1 * | 12/2005 | Olesinski | H04L 47/10 370/235 |

\* cited by examiner

*Primary Examiner* — Barbara Burgess
(74) *Attorney, Agent, or Firm* — Oliff PLC

(57) ABSTRACT

A reliable communication protocol RUDP is provided to transfer data between two systems connected in a network. Working over the unreliable UDP transport layer protocol, the RUDP protocol adds an acknowledging mechanism to otherwise unreliable UDP packets. Contrary to the TCP transport layer protocol, which establishes a connection before any data transfer, the RUDP is used to transfer short amounts of information or messages, so a connectionless communication is used. In a connectionless context the complexity of the encoding-decoding algorithm and the amount of memory consumed by the protocol is reduced. Such characteristics makes the RUDP protocol suitable for its implementation in systems with limited memory and speed, like low processing power 8-bit microcontrollers. Furthermore, by programming the RUDP protocol over the UDP protocol, its implementation in a personal computer can be made with common programming tools.

10 Claims, 6 Drawing Sheets

RELIABLE TRANSPORT LAYER PROTOCOL IN LOW PERFORMANCE 8-BIT MICROCONTROLLERS

BACKGROUND FIELD OF INVENTION

This invention relates to data transmission over a reliable transport layer protocol in a low processing power 8-bit microcontroller.

BACKGROUND DISCUSSION OF PRIOR ART

Communication between modern systems takes place through the use of a protocol layers model. Such model is usually called communication stack because each layer works on top of another. Each one has its own functions according to different levels of abstraction, so a given layer only has to be aware of its adjacent upper and lower neighbors. The stack begins with an Application layer (user related layer) at the top of the stack and finishes with a Link layer (related to the physical communication between systems) at the bottom before it reaches the physical medium.

One of the most common protocol stacks today is the TCP/IP (Transmission Control Protocol/Internet Protocol), which became popular due to the growth of the Internet. FIG. 1 depicts the typical four layers communication stack involved in an Internet connection.

Both source and destination systems (118, 128) have a four layer stack. It is usually called stack because a given layer always work on top of another layer, beginning from the physical media up to the user interface. The bottom layer 110 is the link layer, which provides the network access and network sharing functions. On top of the link layer is the network layer 112, which handles the logical addressing of the existing systems on the network. The next layer is the transport layer 114. It handles the logical connections and the integrity of the information transfer. Finally, the application layer 116 represents the user related application working on the system. It dictates the length and content of the transmitted data.

The source system 118 must send information to another destination system 128, so the user application 126 passes the information to the TCP or UDP protocol 124.

The TCP protocol, located on the transport layer, is a connection-oriented protocol. Before any data transmission, the source node must ask for a connection to be opened at the destination node, that is to say, there must be a previous agreement between both systems previous to the data transfer.

After the connection is established, the information is divided in smaller blocks so the IP layer 122 could be able to handle it as an IP packet. To provide the integrity of the sent data, each block received at the destination node sends back an acknowledge packet to notify about the correct arrival of the information. A sequence number is provided by the source so the destination can tell which block of data is being acknowledged.

If the acknowledge packet doesn't arrive, the source node makes a timeout and resends the unacknowledged packet. A retry counter defines the maximum number of resend packets.

In bi-directional communication, both source and destination systems must send and receive information and acknowledge packets. The TCP protocol supports piggybacking acknowledging, which is able to send back acknowledge packets carrying valid data information on it. With piggybacking acknowledging, unnecessary traffic is avoided since only one packet is sent instead of two.

The sequence number, besides providing the identification mechanism, also provides the order of the packets, so the TCP layer at the destination node is able to reconstruct the original sent information, in the correct order.

When all the information has been transferred, either the source or the destination node asks for a connection termination. Both systems agree to end the connection and the TCP transfer is successful.

There is another transport layer protocol called UDP (User Datagram Protocol). An UDP data transfer doesn't establish a connection between the source and destination systems so every sent packet, called datagram, uses connectionless communication. This protocol doesn't provide the acknowledge and ordering mechanism explained before in the TCP protocol thus every sent datagram is not guaranteed to arrive at the destination. Furthermore, it doesn't provide the correct order of sent datagrams.

In contrast with the TCP protocol, UDP is not a reliable transport protocol, but it requires much less processing power and memory usage.

Every block sent from the TCP or UDP layer is received by the IP layer 122. This protocol is related to the addressing matters, placing the source and the destination addresses in the packet before it reaches the next layer. Those addresses are known as IP addresses. An IP address is a 32-bit number which identifies a node in the network.

The IP layer 122 is also able to fragment every block of information received from the previous layer, in case the network interface layer 120 is unable to handle the actual size of the packet. Generally such fragmentation can be disabled form the application layer. If the fragmentation is disabled and the packet is too big to be managed by the next layer (link layer), that packet is discarded.

Finally, the network interface layer 120 provides the platform to physically send the packet to the network.

At the destination node 128, its link layer 120b receives each piece of information and gives it to the IP layer 122b. If there has been any fragmentation during the transportation of the packets over the network, all the pieces are brought back together before it reaches the TCP (or UDP) layer 124b. In the case of receiving TCP blocks of information, the corresponding acknowledge packets are sent back to the source system. In the case of a UDP packet, the information gets to the final user application 126b with the same order it was received from the UDP layer 124b. In a TCP connection, the information is correctly arranged before it reaches the application layer 126b.

With these four layers the information transfer can take place between two systems. The communication stack separates the type of systems involved in the communication from the communication process itself, being possible the existence of a high processing power system like a personal computer talking to a low processing power system like an 8-bit microcontroller. By those skilled in the art a low processing power 8-bit microcontroller can be considered working at 10 million cycles by second or 10 MHz, with a maximum of 512 bytes in RAM (Random Access Memory).

In a personal computer the programming of the three upper layers (Application Layer 116, Transport Layer 114 and Network Layer 112) can be easily done, since that kind of systems have enough memory and processing power to handle a communication stack. The implementation of those same layers becomes a hard task if we consider the fact that 8-bit microcontrollers are very speed and memory limited to implement those three layers.

The resources needed for the stack (memory and processing time) are mostly used by the TCP protocol. A TCP connection consumes a lot of memory to maintain the connection related information (destination address, source and destination sequence number, etc) as well as a count of the acknowledged and unacknowledged sent blocks of data with their corresponding order in the sending-receiving mechanism. A complex algorithm is also needed to decode an incoming packet, since the connection state dictates the way to process that packet. For example, if the connection already has been established and a data packet is received, the TCP layer considers it as a valid data transfer and sends it to the application layer. If the connection has not been opened or the connection has been closed and the same data packet is received, it would be wasted away, since the actual connection state requires an opening transaction first.

For a personal computer, those resource requirements are easily met, but for low performance microcontrollers there is not enough memory and processing power to handle the TCP layer.

In the recent past there have been many attempts to provide a reliable transport protocol in the context of a low use of memory (e.g., U.S. Pat. No. 6,161,123). With this approach, a new reliable layer is added over the UDP layer and under the user application layer. Even when the amount of memory needed to provide such reliability is lower than a common TCP implementation, the new layer is still connection oriented. It means that both source and destination nodes must be always aware of the state of the connection and must be aware of which pieces of the information are being transferred. Certain memory consumption is still maintained and the decoding algorithm is still complex for an 8-bit microcontroller device.

Another attempt to provide a reliable transport mechanism (e.g., U.S. Pat. No. 6,076,114) also proposes an extra layer over the UDP protocol to ensure the integrity of the information. Again, the connection oriented extra layer and the existence of several connection states take us to the same problem of memory usage and complex decoding processing.

Both methods are suitable in the case of transmission of great amount of information, for example files transfer. However, the most common applications using low performance microcontrollers, in a networking context, only need short bursts of information. In a microcontroller-personal computer or a microcontroller-microcontroller connection scenario, the information traveling back and forward is very likely to contain small quantities of information, considering "low quantities" a number between 0 and 255 bytes. For example, it could contain commands to be executed by the microcontroller or messages indicating or asking the status of the device.

In summary, the memory and processing time required by a TCP protocol or any connection-oriented protocol are not suitable for a low processing power microcontroller.

SUMMARY OF INVENTION

The present invention comprises a method which provides a reliable connectionless protocol to transfer short pieces of information. Such data transfer can take place between two microcontrollers or between a microcontroller and a personal computer.

The proposed protocol works on top of the already existing UDP/IP protocols, which are intrinsically non-reliable. It provides a new communication layer of low memory and processing time usage, suitable for low processing power microcontroller.

Objects and Advantages

Accordingly, several objects and advantages of the present invention are: a) To provide a reliable method for information transfer.
   b) To provide a simple and efficient method of information transfer suitable to the processing and memory limitations of a low processing power microcontroller.
   c) To provide a connectionless method of information transfer, which minimizes the algorithm complexity and the needed processing time.
   d) To provide an efficient method of information transfer suitable for those connections whose amounts of information transfer are in the range of 0 to 255 bytes, or message-oriented.
   e) To provide a program, algorithm or mechanism such that the method could be programmed both on a microcontroller and a personal computer in a simple manner.

Other objects and advantages of this invention will become apparent from a consideration of the ensuing description and drawings.

LIST OF REFERENCE NUMERALS IN DRAWINGS

Figure 1:
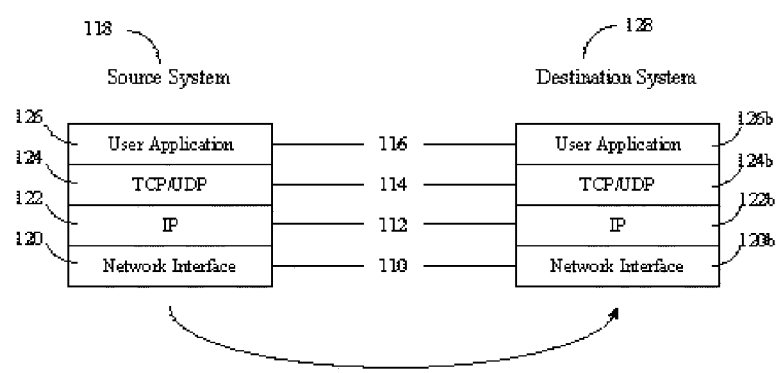
FIG. 1 shows the communication layers involved in a typical TCP/IP-UDP/IP information transfer.

110 Communication Link layer
112 Communication Network layer
114 Communication Transport layer
116 Communication Application layer
118 Hypothetical source system A
120 Network interface
122 IP protocol
124 TCP or UDP protocol
126 User application
128 Hypothetical destination system B
210 Ethernet header
212 IP protocol header
214 UDP protocol header
216 TCP protocol header
218 TCP or UDP data field
310 RUDP protocol header
312 RUDP protocol type of packet field
314 RUDP protocol Packet ID field
316 RUDP data field
414 Data sending process from A to B
416 Data and acknowledge sending process from B to A
418 Acknowledge sending process from A to B
420 Data sending process from A to B
422 Acknowledge sending process from B to A
424 Data sending process from B to A 426 Acknowledge sending process from A to B
510 RUDP protocol
512, 610 Start of function
514, 520, 612, 616, 624, 626, 628, 634 Flowchart decision blocks
516, 522, 614, 618, 630 Flowchart process blocks
518, 524, 620, 622, 632 Flowchart end of function blocks

DETAILED DESCRIPTION

Now, the present invention will be described by referring to the accompanying drawings that illustrate preferred embodiments of the invention.

Figure 2:
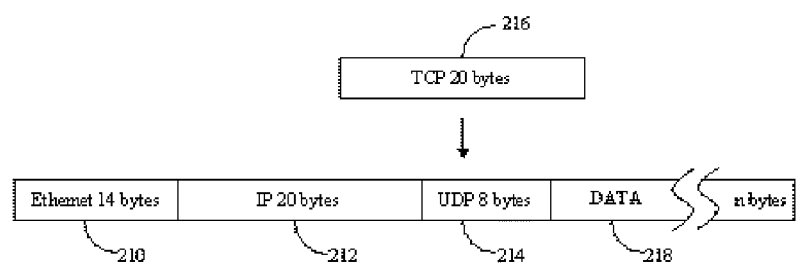
FIG. 2 shows the typical length in bytes of an Ethernet/IP/(TCP-UDP) packet.

A transfer process using the layers stack model shown on the FIG. 1 has a nested scheme. The lower layers are the outer shells, so the information sent or received by the application layer becomes the content of the inner shell. Each shell added by a layer contains information handled only by that layer. That information is generally called layer header, or protocol header. FIG. 2 shows the typical length, measured in bytes, of a UDP/IP and a TCP/IP packet sent over a LAN (Local Area Network) working with the Ethernet standard as the link layer protocol.

The Ethernet header 210 contains all the information needed to send a packet from a source to a destination system connected on the same LAN. The content of this header is irrelevant to this invention.

The IP header 212 contains the following fields: The total length of the IP packet, an identification number of the packet, one flag called "don't fragment", indicating if the packet can (flag equals 0) or can't be fragmented (flag equals 1), one flag called "more fragments" indicating the existence of more fragments (flag equals 1) from the same packet or indicating the presence of the last fragment (flag equals 0), the source IP address and the destination IP address. The other fields are not described due to its irrelevancy to the invention.

The UDP header 214 contains the source and destination ports and the length of the UDP packet. The UDP port provides a mechanism to maintain several logical connections to different applications working on the same system. The source system and the destination system can use different ports to communicate with each other, and that port number is specified in the UDP packet.

The TCP header 216 substitutes the UDP header 214 in the case of a connection-oriented transfer. The explanation of each field is not a matter of the invention. It was included to show the difference, in header length, between both transport protocols. The information being sent by the application is placed in the TCP or UDP data field 218.

The UDP transport protocol, as stated before, doesn't provide a reliable transfer mechanism. By the inclusion of an intermediate transport layer called RUDP (ReliableUDP), a reliable communication protocol is provided in a message-oriented information transfer.

Figure 3:
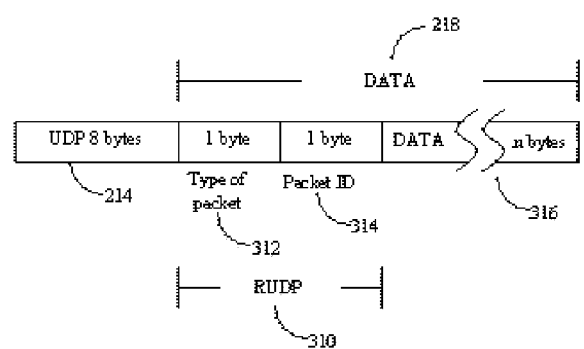
FIG. 3 shows a UDP datagram including the RUDP two-fields header.

Two new fields representing the RUDP protocol header must be added as part of the data field in a UDP datagram. FIG. 3 shows a UDP datagram including the UDP header 214 and UDP data field 218. Two new fields have been included into the data field 218. Together, they form the RUDP header 310. The Type of packet field 312 is a one-byte value with three possible meanings:

The packet contains valid data that must be acknowledged (reliable context). This value is called acknowledged service.

The packet contains valid data that doesn't need to be acknowledged (unreliable context). This value is called unacknowledged service The packet is an acknowledge response, so the data field is not valid. This value is called acknowledge service response. The packet ID field 314 is a one-byte field. It has different meanings according to the Type of Packet field 312, as follows:

If the packet contains valid data that must be acknowledged, the packet ID contains a number between 1 and 255 chosen by the source system. That number is sequentially increased with each send command executed by the application layer, whether the transfer is successful or not.

If the packet contains valid data that doesn't need to be acknowledged, this field is ignored.

If the packet is an acknowledged response, this field contains the packet ID of the data packet that is being acknowledged.

The sent message is contained in the RUDP data field 316. The length of this field can be obtained subtracting two bytes (the length of the RUDP header) from the length field in the UDP header 214.

The conditions named before can be summarized in the following table: Type of packet Packet IDData field 0.times.01=Acknowledge serviceNumber between 1-255Valid data0.times.02=Unacknowledged serviceIgnoredValid data0.times.03=Acknowledge service response Previously received Packet ID between 1-255IgnoredThe RUDP layer works on top of the UDP layer and under the application layer. All information to be sent is received by the RUDP layer. The type of packet and packet ID fields are added as the beginning of the UDP data field. The type of packet must be the equivalent acknowledge service number (0.times.01) for reliable communication or the equivalent unacknowledged service number (0.times.02) for unreliable communication. The unacknowledged service has the same function as a normal UDP data transfer.

After sending a packet with the acknowledge service, a timer is turned on to wait for the arrival of the corresponding acknowledge service response (0.times.03) packet, whose packet ID field matches the original sent packet ID. If the timer expires, the packet is resent and the timer is reset and turned on again. This procedure is repeated until an acknowledge arrives or until the maximum number of retries is reached. At this point the application layer is informed about the success or failure of the transfer. Any duplicated or out of time acknowledge response packet is discarded.

At the receiving system, an incoming acknowledge service packet always generates back an acknowledge service response packet. The new received packet is then checked in case it is a duplicated message. This is done by storing the packet ID and source address of the most recent received packets. If there is a match, it means the packet was already received before but the acknowledge response was lost; the incoming packet is ignored.

If the packet is valid (not duplicated), the message is passed to the application layer at the destination system.

An incoming unacknowledged service packet is not verified. It just goes up to the application layer at the destination system.

Communication in this invention considers two low processing power microcontrollers or a personal computer and a microcontroller as the source and destination systems. Most of the microcontroller related applications do not need great amounts if information. They are likely based on the transmission of short messages, considering a short message as a group of bytes in the range of 0 to 255 bytes, which dictates, for example, the mode of operation of the microcontroller. Applications involved with the handling of big pieces of information, like a file transfer mechanism, use more sophisticated equipment, capable of handling all that information in an efficient way.

In a short message context, some simplifications can be applied in this invention.

First, every packet is independent from the previous and subsequent packets, since all information is short enough to be contained in a single UDP/IP packet. In consequence, fragmentation of information at the IP layer is unnecessary. In the microcontroller, every sent packet must have the "don't fragment" flag in the 1 state on the IP header in order to avoid fragmentation. It must also has the "more fragment" flag in the 0 state, indicating the existence of only one IP fragment. At the same time, every received packet must be checked for that same state in both flags. If any of the flags are not in the indicated states, the packet is ignored.

Figure 4:
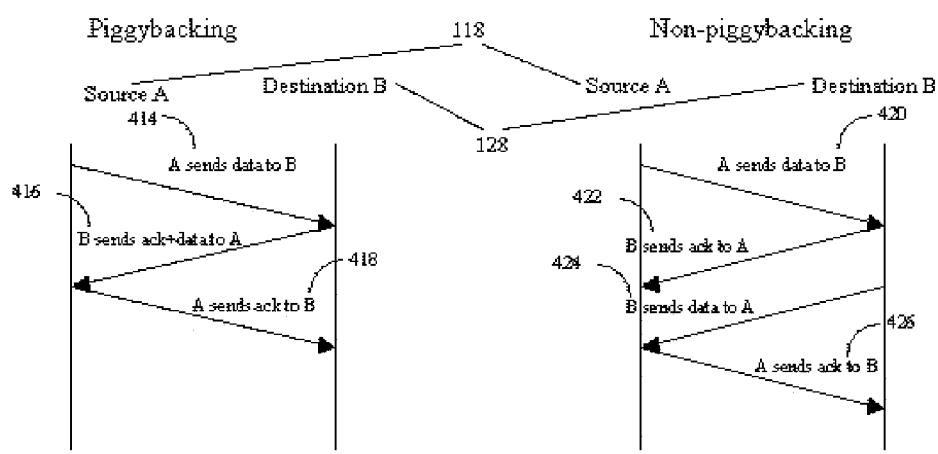
FIG. 4 shows a piggybacking vs. a non-piggybacking information transfer.

Second, it is very unlikely to find a bi-directional communication. Most times, the transfer takes place in one direction. In consequence, there is no need of a piggybacking acknowledging mechanism and one packet ID field is enough for an exclusive non-piggybacking mechanism, instead of the two sequence numbers found on TCP for the received and transmitted data. In the case of a bi-directional communication (a sent message originates another returning message) there will be a penalty of one extra acknowledges message sent. FIG. 4 shows both situations. In a piggybacking mechanism, the source system A 118 sends a packet to destination system B 128 (414). Destination B 128 sends back its message and the corresponding acknowledge to the source A 118 (416). The source A 118 sends the final acknowledge to destination B 128 (418). In this mechanism there is a total of three sent procedures.

In a non-piggybacking mechanism, the source A 118 sends a packet to destination B 128 (420). Destination B 128 sends back the acknowledge packet (422) followed by another packet containing his own message (424). The source A 118 receives both packets and sends back the corresponding acknowledge to destination B 128 (426). There is a total of four packets involved in this mechanism.

The penalty lies in an extra sent packet containing an acknowledgment and the delay time associated with the assembly of that packet. However, a forced non-piggybacking mechanism implies less complexity in both the sending and receiving mechanism, since de RUDP layer doesn't need to be aware of any pending outgoing message to be sent with an acknowledge response, and neither it has to handle an incoming acknowledge response coming with a new message.

In third place, the protocol does not need to establish a connection between the source and the destination system. A connectionless scheme is enough in a message-oriented context, since the information messages are not related with each other. Thus the whole communication process is reduced to a sending mechanism and a receiving mechanism. A mechanism to open and close a connection (like the TCP protocol) is not needed anymore, reducing the protocol's algorithmic complexity.

Figure 5:
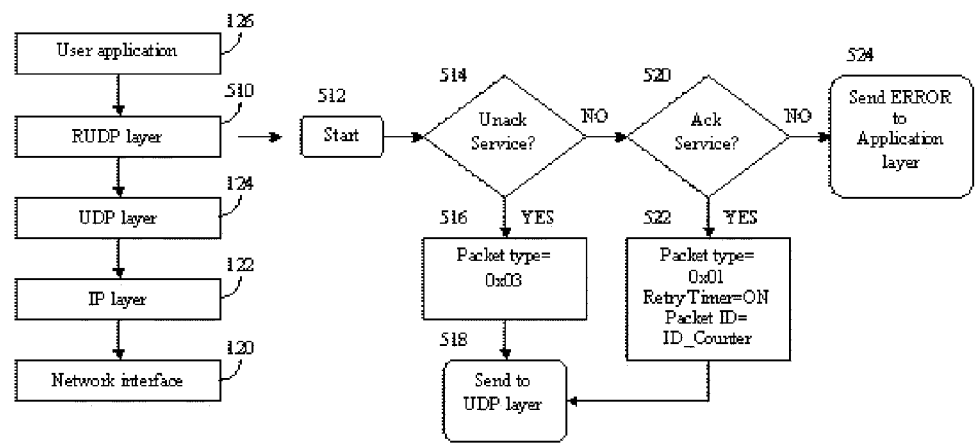
FIG. 5 shows the flowchart of the RUDP protocol send function.

Both functions can be clearly explained with a flowchart describing the algorithm needed to generate an outgoing message and the algorithm needed to decode an incoming message. FIG. 5 shows the send function. The information or message to be sent comes from the user application 126 at the top of the stack to the RUDP layer 510. The provided algorithm 512-524 assemblies the packet and places it on the UDP layer 124. The corresponding header is added on the UDP 124, IP 122 and network interface 120 layers and finally the packet is sent over the network.

Figure 6:
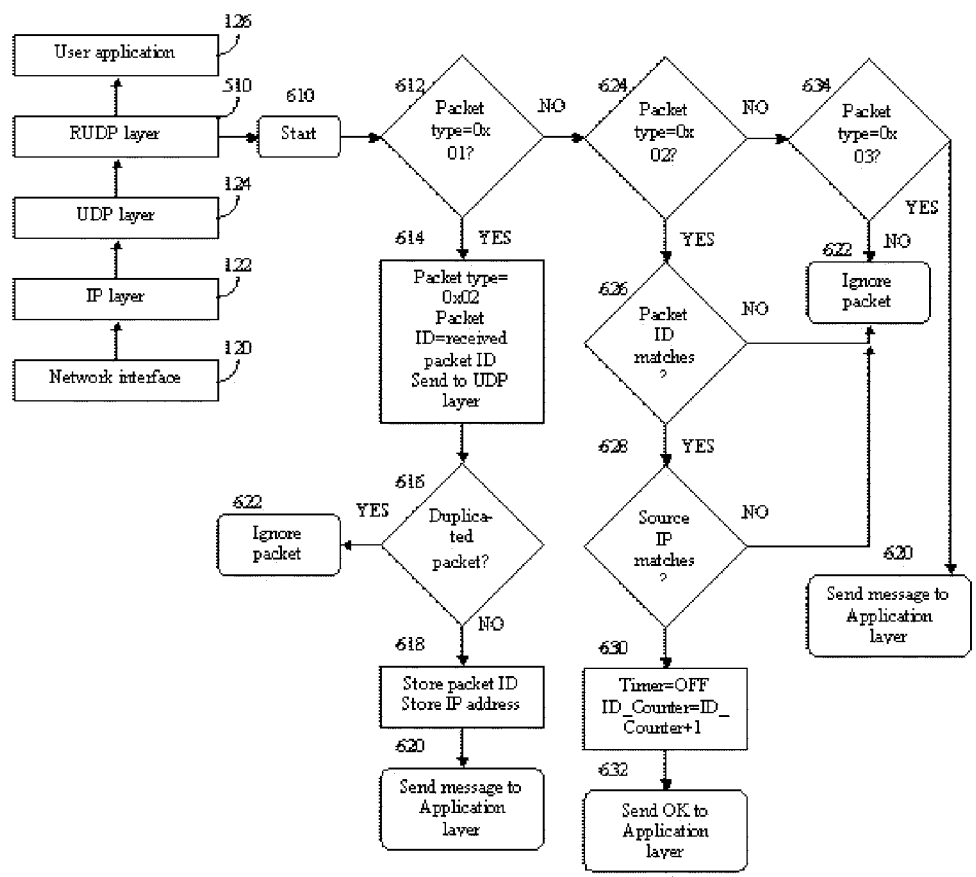
FIG. 6 shows the flowchart of the RUDP protocol receive function.

A complementary receive function shown on FIG. 6 takes an incoming packet and decodes each header in an inverse order: Network interface 120 header first, followed by the IP 122 header and the UDP 124 header. The packet received by the RUDP layer 510 is finally decoded according to the algorithm 610-634.

Operation of Invention

As said before, the invention takes in account two main processes, a sending function and a receiving function, being the receiving function the one with major complexity.

The sending function, as shown on FIG. 5, shows the user application 126, which commands the RUDP layer 510 to send a message. The process begins at 512. If the application layer asks for an unacknowledged service (514), the packet type takes the corresponding value of 0.times.03 (516) and the packet is sent to the UDP layer (518).

If the application layer asks for an acknowledge service (520), the packet type takes the corresponding value of 0.times.01, the retry timer is set and the packet ID takes the value in the ID_Counter (522). ID_Counter is an increasing counter which stores the actual value to be assigned to the packet ID. By sending sequential packet ID numbers, the destination system, if needed, can notice about the loss of a message. When it reaches the maximum value 255 it goes back to 1. Finally, the packet is sent to the next layer, the UDP layer (518).

If the user application asks for an unknown service number, an error warning is sent back (524).

The UDP layer places the source port and the destination port. The source port is a 16-bit number indicating which port is available in the source system to receive any incoming packet. The destination port must be a 16 bit number known by the application layer. That port should be available at the destination system to receive the packet.

At the IP layer, the "don't fragment" flag is set to 1, and the more fragment flag is set to 0. The source and destination addresses are placed and the packet is sent to the link layer where will be sent to the network.

The receiving function, shown on FIG. 6, begins with the acceptance of a packet from the network at the network interface layer 120. The original packet has headers from every layer. The link layer extracts the link layer header and passes the IP-UDPRUDP-Application packet to the IP layer 122. This layer takes the IP header to check if the "don't fragment" flag is set to the 1 state and the "more fragment" flag is set to the 0 state. If that is the case, the UDP-RUDP-Application packet is delivered to the next layer, UDP (124). Otherwise, the packet is discarded.

At the UDP layer 124 the destination port of the packet is extracted from the UDP header and is matched with the actual available open ports. If there is a match, the RUDP-Application packet is accepted for the next layer, the RUDP 510; otherwise, it's discarded. Any subsequent response that should be sent to the system where the packet came from will go to the source port provided in the UDP header.

At the RUDP layer 510, the receive function starts (610) the decoding process. The type of packet field is first checked (612) for an acknowledge service message, identified by a 0.times.01. If that is the case, an acknowledge service response message is generated (614) by placing a 0.times.02 in the type of packet field and assigning the same packet ID as the received message. Finally, the response is sent to the UDP layer to be sent to the network.

The received message is then checked for duplicity (616). It is done by comparing the packet ID and the IP address of the source system with the packet ID's-source IP addresses from the most recent received packets. If there is a match, the message is ignored (622). If the message is not duplicated, the information about the ID packet and source IP address is stored (618) and the message is finally sent to the application layer (620).

If the type of packet turns out to be 0.times.02 (624), the message is an acknowledge service response to a previously sent message. The packet ID and the source IP address are matched to the values of the previously sent message (626, 628). If any of those values don't match, the acknowledge response is wrong and it's ignored (622).

When the acknowledge response is OK the retry timer is disabled and the ID_counter is incremented by one (630). The RUDP layer returns an OK value to the application layer 632 indicating the message transfer was successful.

Finally, when the type of packet is a 0.times.03 (634), the message is immediately delivered to the application layer (620), since the packet arrived as an unacknowledged service. Any RUDP packet with unknown packet type is ignored (622).

CONCLUSION, RAMIFICATIONS AND SCOPE OF INVENTION

Thus, the reader will see that the communication method of the invention provides a reliable, connectionless protocol, which minimizes the memory and processing time usage.

By working on top of a common UDP/IP communication stack, its implementation in a personal computer is simplified. Furthermore, by using a message-oriented instead of a connection-oriented scheme it is possible to implement the encoding-decoding algorithm in a low processing power 8-bit microcontroller with a minimum consumption of memory and processing time.

This invention shows a method for a reliable communication independent from the system on which is implemented. The present description particularly considers a personal computer and 8-bit microcontrollers as communication systems to show the flexibility of the implementation.

While our above description contains many specificities, these should not be construed as limitations to the scope of the invention, but rather as an exemplification of one preferred embodiment thereof. Obviously, modifications and alterations will occur to others upon a reading and understanding of this specification such as, for example, several possible variations to the presented packet structure to include other fields into the protocol's header, or changing the length or order of the specified fields.

The description above is intended, however, to include all such modifications and alterations insofar as they come within the scope of the appended claims or the equivalents thereof.

What is claimed is:

1. A method for enhancing a data transfer process that uses a layers stack model based on User Datagram Protocol (UDP), the method comprising:
   adding a Reliable User Datagram Protocol (RUDP) intermediate transport layer that includes a short header having two one-byte control fields to a data portion of a UDP data packet, the UDP data packet including a UDP layer, one of the two extra control fields being a packet type field, and the other being a packet ID field; and
   transferring the UDP data packet with the added RUDP intermediate transport layer between nodes over a network operating by way of processors that are to take part as the nodes transferring data in the network.

2. The method of claim 1, wherein a value of the packet type field that indicates a type of transmission service for the UDP data packet is set by an application layer of the UDP data packet, the value of the packet type field indicating that the UDP packet is either: (i) a packet that contains data that must be acknowledged; (ii) a packet that contains data that does not need to be acknowledged; or (iii) a packet that is an 'acknowledge' response, so any data in the packet is meaningless.

3. The method of claim 1, wherein the packet ID field is an incremental packet counter assigned by an application layer of the UDP packet, its value being either (i) a consecutive number that is sequentially increased with each send command executed by the application layer if the UDP packet contains data that must be acknowledged, or (ii) the packet ID of a data packet being acknowledged if the UDP data packet is an 'acknowledge' response, wherein the packet ID field is ignored if the UDP data packet contains data that does not need to be acknowledged.

4. The method of claim 1,
   wherein the UDP data packet is transferred with an acknowledgement request, and
   wherein the method further comprises:
      turning on a timer;
      waiting for an acknowledgement for the transferred UDP data packet;
      resending the UDP data packet if the timer exceeds a preset response time without receiving the acknowledgement;
      repeating the waiting and the resending steps until an acknowledgement is received or a preset number of retries is reached; and
      reporting results.

5. The method of claim 1, further comprising:
   receiving a packet with an acknowledgement request; and
   checking whether the received packet is a duplicate packet by comparing a packet ID of the received packet with that of a previously received packet,
   wherein the UDP data packet is transferred as an 'acknowledge' response.

6. The method of claim 1, wherein the UDP data packet further comprises an IP layer comprising:
   a plurality of flags including (i) a do not fragment flag that indicates if the UDP data packet can or cannot be fragmented and (ii) a more fragments flag that indicates the existence of more fragments in the UDP data packet or the presence of a last fragment in the UDP data packet;
   a source IP address; and
   a destination IP address.

7. The method of claim 1, wherein the network is a local network and the processors are either (i) both 8-bit microcontrollers, or (ii) a personal computer and an 8-bit microcontroller.

8. The method of claim 1, wherein the RUDP layer is added between the UDP layer of the UDP data packet and an application layer of the UDP data packet.

9. The method of claim 8, wherein the UDP layer consists of 8 bytes.

10. The method of claim 1, wherein the short header of the RUDP intermediate transport layer consists of only the two one-byte control fields.

* * * * *